United States Patent [19]

Freimuth et al.

[11] 4,020,750

[45] May 3, 1977

[54] PISTON PUMP MECHANISM

[75] Inventors: Gerhart William Freimuth, Flemington; Jerold Samuel Weiner, Spotswood, both of N.J.

[73] Assignee: Gerhart Engineering and Machine Co., Somerville, N.J.

[22] Filed: Nov. 3, 1975

[21] Appl. No.: 628,348

[52] U.S. Cl. .................................. 92/205; 92/250; 277/165; 277/187

[51] Int. Cl.² ......................................... F16J 1/06

[58] Field of Search ............... 92/205, 250, 201; 277/165, 187; 128/234

[56] References Cited

UNITED STATES PATENTS

| | | | |
|---|---|---|---|
| 994,558 | 6/1911 | Aspinwall | 92/205 |
| 1,325,006 | 12/1919 | Dearsley | 92/267 |
| 1,570,043 | 1/1926 | Cormier | 92/205 |
| 1,728,591 | 9/1929 | Brauer | 92/205 |
| 1,955,157 | 4/1934 | Wayne | 92/205 |
| 2,157,039 | 5/1939 | Van Hooydonk | 92/206 |
| 2,298,584 | 10/1942 | Onidns | 277/165 |
| 2,394,687 | 2/1946 | Hein | 128/234 |
| 3,300,225 | 1/1967 | Shepler | 277/165 |
| 3,636,824 | 1/1972 | Clark | 277/165 X |

*Primary Examiner*—Irwin C. Cohen

[57] ABSTRACT

A piston pump mechanism includes a plunger head slideably mounted within a cylindrical sleeve member. The plunger head has an upper portion forming a shoulder and a reduced lower portion around which an inner ring of resilient material is mounted. An outer ring of resilient material, such as tetrafluroethylene, for example, is mounted around the inner ring. A piston rod has an end coupled to the transverse face of the reduced portion of the plunger head in such manner to provide axial adjustment therebetween, and a pressure cap is mounted upon this end. The pressure cap has a cylindrical like peripheral rim for applying a progressively greater axial force against the inner ring, causing the inner ring of material to apply a progressively greater radial force against the outer ring, as the piston rod and cap assembly are axially adjusted toward the plunger head, until the outer ring of material seals against the interior wall of the sleeve.

9 Claims, 2 Drawing Figures

PISTON PUMP MECHANISM

This invention relates generally to piston pump mechanisms, and more specifically to an adjustable sealing assembly for a plunger head.

In many industries where a product, such as a fluid, must be transported by piston pump mechanisms, it is imperative that the pump mechanism not contaminate, impart impurities to, or chemically react with the product being pumped or dispersed. Such industries, for example, include the drug and food industries.

To provide a non-contaminating and substantially chemically inert pump mechanism or assembly, stainless steel and tetrafluroethylene are one combination of materials that are applicable for use in such a mechanism. Accordingly, prior art pump mechanisms have included these materials in pump assemblies having stainless steel plunger heads with O-ring seals of tetrafluroethylene or other suitable material. Such assemblies have been proven unreliable, in that the O-rings tend to deform, breakdown, and distort, causing contamination of the product by portions of the O-ring breaking off and entering the product mix, and also causing a loss in sealing efficiency. Another problem with tetrafluroethylene is that it tends to cold flow.

Other attempts in the prior art to obtain a reliable and non-contaminating sealing mechanism for piston pumps includes the use of "chevron" seals. Tetrafluroethylene is one of a number of materials that have been used in "chevron" seals. "Chevron" seals tend to be unreliable, in that the edges of the "chevron" seal members are subject to deterioration, causing slivers of the material of such seals to enter and contaminate the product. In addition, "Chevron" seals require a large plurality of parts, and include many crevaces for product to leak into, as the seal deteriorates. An example of a "chevron" seal having leather and rubber V-rings can be found in Pfauser Patent 2,188,957.

To overcome these and other problems of the prior art, the subject piston pump mechanism includes a plunger head contained within a cylindrical sleeve. A reduced lower portion of the plunger head has a cylindrical like side wall around which is mounted an inner ring of resilient material. An outer ring of tetrafluroethylene is mounted around the inner ring. A piston rod is connected to a lower transverse face of the plunger head, and a pressure cap is mounted upon the piston rod. The pressure cap is positioned for applying an axial force against the lower end of the inner ring, of sufficient magnitude, to cause the inner ring to exert a radial force against the outer ring to seal the outer ring against the interior wall of the sleeve.

Figure 1:
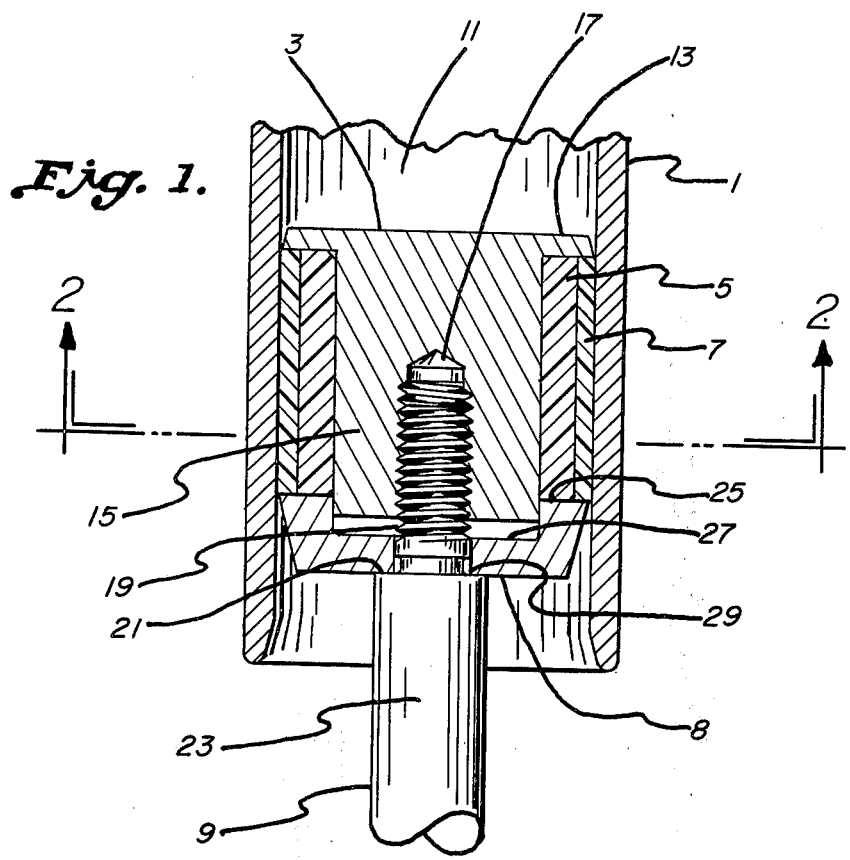
FIG. 1 is an axial cross-sectional view of the piston pump mechanism.
Figure 2:
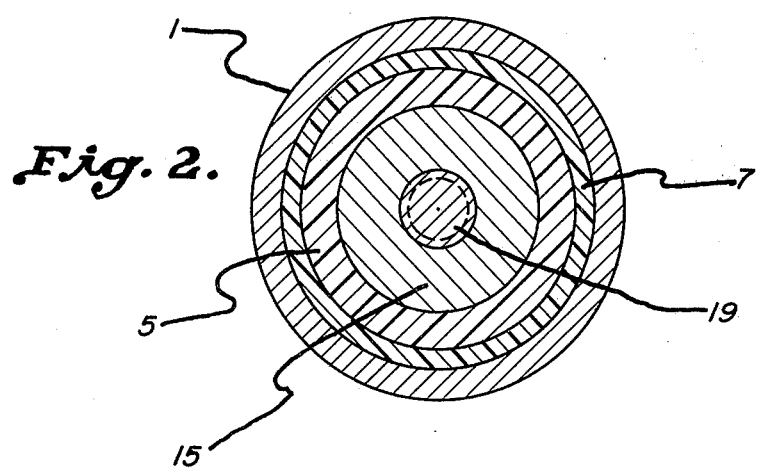
FIG. 2 is a radial cross-sectional view of the piston pump mechanism taken on line 2—2 of FIG. 1, looking in the direction of the arrows.

The piston pump mechanism includes a sleeve 1, a plunger head 3, inner and outer rings of resilient material 5, 7, a pressure cap 8, and a piston rod 9 (See FIGS. 1 and 2).

As shown, the plunger head 3 is slideably contained for axial movement within and with respect to the cylindrical sleeve 1. The interior portion 11 of the sleeve 1 above the upper transverse face of the plunger head or piston 3 contains a product to be pumped or dispensed.

The plunger head 3 has an uppermost portion 13 forming a shoulder. Concentric with and below this shoulder is a reduced lower portion 15, having an end terminating as the lower transverse face of the plunger head 3. The wall of this reduced portion or segment 15 is cylindrical, and faces the cylindrical interior wall of the sleeve 1. A centrally located threaded hole 17 is axially run into a portion of the reduced segment 15 from the lower transverse face.

An inner ring 5 of resilient or elastomeric material is mounted around the cylindrical wall of the reduced portion 15 of the plunger head 3. An outer ring 7 of resilient material is mounted around the inner ring 5. It is preferred that the width or axial length of the outer ring 7 be slightly shorter or less than that of the inner ring 5. The upper or top ends of the outer and inner rings 7, 5 are abutted against the interior transverse face of the shoulder 13 of plunger head 3.

The piston rod 9 has a stub-like reduced end 19, the upper portion of which is threaded for mating with the threaded hole 17 of the plunger head 3. A shoulder 21 is formed at the junction of this reduced end 19 and the unreduced lower end 23 of the piston rod 9.

The pressure cap 8 has the shape of a dished annulus provided with a peripheral rim 25. The radial thickness of the rim 25 is about the combined thickness of the inner and outer rings 5, 7. The dished portion 27 of pressure cap 8 has a diameter slightly greater than that of the lower transverse face of the plunger head 3. An axial hole 29 is centrally located in the pressure cap 8, the hole 29 having a diameter slightly larger than the outside diameter of the reduced end 19 of piston rod 9.

Assembly of the piston pump mechanism (See FIG. 1) is completed by mounting and orienting the pressure cap 8 on the reduced end 19 of the piston rod 9, as shown. The reduced end 19 of the piston rod 9 is then screwed into the threaded hole 17 of plunger head 3. As the piston rod is screwed into the hole 17 of plunger head 3, the transverse face of the peripheral rim 25 of the pressure cap 8 engages and applies successively greater axial force to the inner ring 5. This axial or axial compressive force causes the inner ring 5 to radially deform. This radial deformation of the inner ring 5, in turn causes this ring 5 to exert a radial force along the inner surface of the outer ring 7. The piston rod 9 is screwed into the plunger head 3 to such point that the radial force exerted against the outer ring 7 is of sufficient magnitude to cause the outer ring 7 to "seal" against the cylindrical interior wall of the sleeve 1. This "sealing" is of course required to prevent the escape of product from the interior of the sleeve 1 past the plunger hand 3, while permitting the plunger head 3 to reciprocate within the sleeve 1 to provide pumping action. Product enters the chamber 11 of the sleeve 1 during a downstroke of plunger head 3, and is forced from this chamber 11, during an upstroke of plunger head 3.

In the preferred embodiment, as previously mentioned, the outer ring 7 is fabricated from tetrafluroethylene. Tetrafluroethylene is preferred because of its inherent low coefficient of friction and substantial chemical inertness. Various applications may dictate or permit the use of other suitable materials.

Many materials are suitable for use as the inner ring 5. For example, polyurethane has been found to be an excellent material for this application.

Also in the preferred embodiment, stainless steel is used for fabricating the sleeve 1, plunger head 3, pressure cap 8, and piston rod 9. Of course, other materials are suitable for such use, depending upon the application.

Although this invention has been described with particular reference to preferred embodiments, it is not intended to limit the scope of the invention to the embodiments illustrated, nor otherwise than by the terms of the subjoined claims.

What is claimed is:

1. A piston pump mechanism comprising:
   a cylindrical sleeve member having an interior wall:
   a plunger head, slideably mounted within said sleeve, of a rigid material having an upper portion forming a shoulder, a reduced lower portion of said plunger head being concentric with said upper portion, a transverse face of said lower portion having a centrally located threaded hole;
   a first ring of resilient material mounted only around a major portion of said lower portion of and having one end abutted against said shoulder of said plunger head;
   a second ring of resilient material mounted only around said first ring and slightly less in width than said first ring of resilient material, and having one end abutted against said shoulder of said plunger head;
   a pressure cap having the shape of a dished annulus provided with a peripheral rim, the radial thickness of said rim being about the combined thickness of said first and second rings as joined, substantially preventing cold flow, if any, of the material of said first and second rings, the dished portion having a diameter slightly greater than that of the lower portion of said plunger head slideably engaging this lower portion, and a centrally located hole; and
   a piston rod having a stub-like reduced end which is threaded for mating with said threaded hole of said plunger, a shoulder being formed at the junction of said reduced end and the unreduced portion of said piston rod, said reduced end being inserted through the hole of said pressure cap, a portion of said pressure cap resting upon said shoulder, whereby said cap is oriented so that as said rod is screwed into said plunger head, the top of said peripheral rim of the cap increasingly applies an axial force against the other end of said first ring, resulting in said first ring applying an increasing radial force against said second ring, and said rod is screwed into said plunger to the point at which said second ring seals against the interior wall of said sleeve.

2. The piston pump mechanism of claim 1, wherein said first and second rings of resilient material are fabricated from polyurethane and tetrafluroethylene materials, respectively.

3. The piston pump mechanism claim 1, wherein said plunger head, pressure cap, and sleeve are each fabricated from stainless steel.

4. The piston pump mechanism of claim 1, wherein said second ring of resilient material is fabricated from tetrafluroethylene.

5. A piston pump mechanism comprising:
   a cylindrical sleeve member having an interior wall;
   a plunger head having an upper portion forming a shoulder and a reduced lower portion having a transverse face, the transverse face having a centrally located axially directed threaded hole, said plunger head being slideably mounted within said sleeve;
   inner and outer cylindrical bands of resilient material, said inner band being mounted around said reduced portion of said plunger head, said outer band being mounted around said inner band, with like ends of said inner and outer bands abutting against the shoulder of said plunger head;
   a piston rod having a stub-like threaded reduced end screwed into the hole in said transverse face of the lower portion of said plunger head to provide axial adjustment therebetween, the unreduced end of the piston rod forming a shoulder at a junction formed with the reduced end; and
   pressure cap means mounted upon the shoulder of said piston rod, slideably engaging the reduced portion of said plunger head, and applying an increasing axial force against said inner band, causing said inner band to apply an increasing radial force against said outer band, as said piston rod is axially adjusted toward said plunger head, causing said outer band to seal against the interior wall of said sleeve, thereby preventing the escape of a fluid within the interior of said sleeve above said plunger head.

6. The piston pump mechanism of claim 5, wherein said pressure cap means includes:
   a pressure cap having the shape of a dished annulus provided with a peripheral rim, the radial thickness of said rim being about the combined thickness of said inner and outer bands of resilient material, the dished portion having a diameter slighty greater than that of the lower portion of said plunger head for slideably engaging this lower portion, and a centrally located hole through which said stub-like reduced end of said piston rod is inserted; whereby the shoulder of said piston rod forces the peripheral rim of said cap against said inner band of resilient material, as the axial distance between said piston rod and said plunger head is reduced.

7. The piston pump mechanism of claim 5, wherein said inner and outer bands of resilient material are fabricated from polyurethane and tetrafluroethylene, respectively.

8. The piston pump mechanism of claim 5, wherein said outer band of resilient material is fabricated from tetrafluroethylene.

9. The piston pump mechanism of claim 5, wherein said inner band has a greater axial length than said outer band.

* * * * *